United States Patent
Hara

(10) Patent No.: US 9,630,705 B2
(45) Date of Patent: Apr. 25, 2017

(54) DRIVE SYSTEM FOR GROUND SPOILER, AND AIRCRAFT

(71) Applicant: MITSUBISHI AIRCRAFT CORPORATION, Aichi (JP)

(72) Inventor: Akihiro Hara, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 132 days.

(21) Appl. No.: 14/190,756

(22) Filed: Feb. 26, 2014

(65) Prior Publication Data
US 2014/0239126 A1 Aug. 28, 2014

(30) Foreign Application Priority Data
Feb. 28, 2013 (JP) .................................. 2013-39638

(51) Int. Cl.
*B64F 1/02* (2006.01)
*B64C 13/16* (2006.01)
*B64C 9/32* (2006.01)

(52) U.S. Cl.
CPC ................ *B64C 13/16* (2013.01); *B64C 9/32* (2013.01)

(58) Field of Classification Search
CPC ......... B64C 13/00; B64C 13/16; B64C 13/24; B64C 9/32; B64C 9/323; G05D 1/0676; G05D 1/0653
See application file for complete search history.

(56) References Cited

U.S. PATENT DOCUMENTS

| | | | | |
|---|---|---|---|---|
| 3,339,866 A | * | 9/1967 | Paluka et al. | 244/113 |
| 4,671,650 A | * | 6/1987 | Hirzel | G01P 3/806 |
| | | | | 324/160 |
| 5,008,825 A | * | 4/1991 | Nadkarni et al. | 701/4 |
| 5,826,833 A | * | 10/1998 | Evans et al. | 244/183 |

(Continued)

FOREIGN PATENT DOCUMENTS

| | | |
|---|---|---|
| JP | 2011-504838 A | 2/2011 |
| WO | 2009/068067 A1 | 6/2009 |

OTHER PUBLICATIONS

"Practical Dictionary of Aviation Terms" edited by Public Relations of Japan Airlines, Asahi Sonorama, May 1997, p. 122.

*Primary Examiner* — Philip J Bonzell
(74) *Attorney, Agent, or Firm* — Pearne & Gordon LLP

(57) ABSTRACT

The present invention provides a drive system which can automatically deploy a ground spoiler even when a wheel is locked. A drive system for a ground spoiler deploys closed ground spoilers 4A to 4D when a wheel speed $V_W$ exceeds a wheel reference speed $V_{W1}$ or when an air speed $V_B$ exceeds an air reference speed $V_{B1}$ after a main gear 6 touches down. The system may also close the deployed ground spoilers 4A to 4D when the wheel speed $V_W$ is smaller than a wheel reference speed $V_{W2}$ or when the air speed $V_B$ is smaller than an air reference speed $V_{B2}$.

20 Claims, 6 Drawing Sheets

(56) References Cited

U.S. PATENT DOCUMENTS

| | | |
|---|---|---|
| 6,241,183 B1* | 6/2001 | Mathieu ..................... 244/99.11 |
| 6,561,463 B1* | 5/2003 | Yount et al. .................. 244/196 |
| 2003/0140704 A1* | 7/2003 | Kurtz ........................ G01F 1/46 |
| | | 73/727 |
| 2007/0203633 A1* | 8/2007 | Johnsen ................ B64C 25/426 |
| | | 701/70 |
| 2010/0217460 A1* | 8/2010 | Polati De Souza et al. ... 701/18 |
| 2013/0233975 A1* | 9/2013 | Joalland et al. .............. 244/194 |

\* cited by examiner

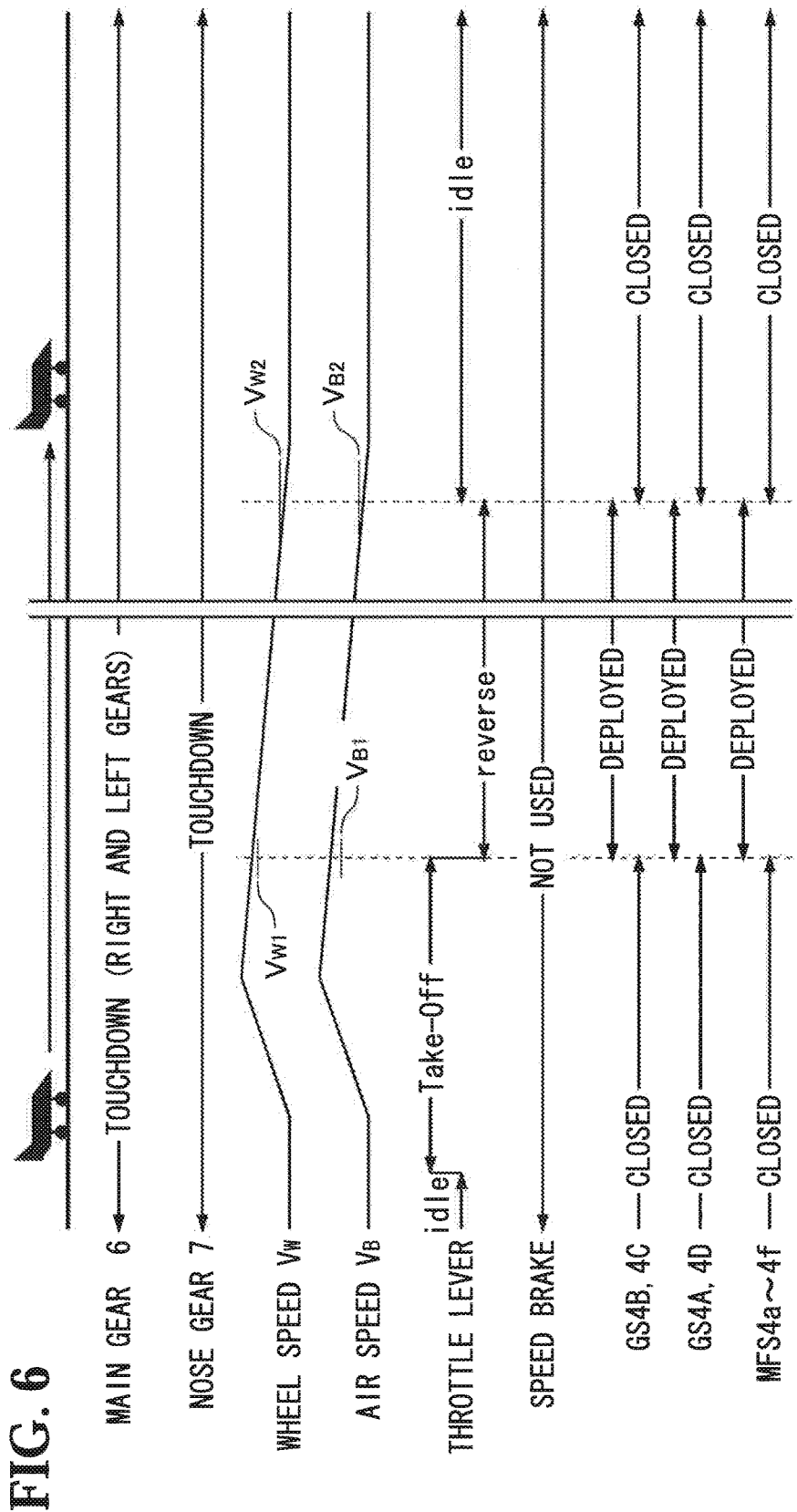

DRIVE SYSTEM FOR GROUND SPOILER, AND AIRCRAFT

BACKGROUND OF THE INVENTION

Field of the Invention

The present invention relates to a technique for automatically deploying a ground spoiler that is provided at a main wing of an aircraft.

Description of the Related Art

Spoilers provided at a main wing of an aircraft are provided in order to reduce a lift generated by the main wing. The spoilers are generally divided into a flight spoiler that operates during a flight, a ground spoiler that operates in a running state at the time of takeoff and landing, and a multi-function spoiler that operates both during a flight and in a running state. In the present invention, the ground spoiler is used as a concept including the multi-function spoiler that operates in a running state as well.

The ground spoiler is a flight control surface mounted to a main wing, and is one of devices for reducing a lift of an aircraft. When the ground spoiler is deployed after the aircraft lands on the ground, the ground spoiler creates a stall behind the ground spoiler. The lift of the main wing is thereby reduced. In a case of an aircraft equipped with a turbojet engine, the ground spoiler functions as means for shortening a landing run distance of the aircraft after landing together with a thrust reverser (National Publication of International Patent Application No. 2011-504838). However, operations of the ground spoiler and the thrust reverser differ from each other in that the ground spoiler focuses on reducing a lift, and the thrust reverser focuses on increasing a drag.

In order to accomplish its object, the ground spoiler is designed so as to be deployed automatically, that is, without being controlled by a pilot after landing (e.g., "Practical Dictionary of Aviation Terms" edited by Public Relations of Japan Airlines, Asahi Sonorama, May 1997, p. 122). Conventionally, various standards have been employed for automatically deploying the ground spoiler. For example, the ground spoiler is automatically deployed on condition that a rotating speed (a wheel speed) of a wheel provided on a main gear reaches a prescribed value after the main gear touches down. However, if a runaway surface is wet or frozen and thus slippery, the wheel cannot rotate properly and may thus become locked. In this case, a pilot manually deploys the ground spoiler.

Thus, an object of the present invention is to provide a drive system which can automatically deploy the ground spoiler even when the wheel is locked.

SUMMARY OF THE INVENTION

To achieve the above object, a drive system for a ground spoiler of an aircraft according to the present invention includes:

wheel speed detecting part that detects a wheel speed of the aircraft;

air speed detecting part that detects an air speed of the aircraft; and a control unit that controls driving of the ground spoiler, wherein the control unit performs control for deploying the ground spoiler when the wheel speed exceeds a predetermined first wheel reference speed or when the air speed exceeds a predetermined first air reference speed with a main gear of the aircraft touching down.

The drive system for a ground spoiler according to the present invention produces a following effect. When a wheel is locked to the main gear for some reason, the wheel does not rotate properly even when the wheel touches down. In this case, the ground spoiler is deployed when the air speed exceeds the first air reference speed determined in advance. Therefore, the ground spoiler can be reliably deployed automatically even when the wheel is locked.

In the drive system for a ground spoiler according to the present invention, when a plurality of ground spoilers are provided, the control unit may deploy one or some of the ground spoilers while delaying the deployment from deployment of the other ground spoiler(s) by a predetermined length of time.

This is because a pitching moment in a direction to lower a nose of the aircraft becomes excessive and a large load is applied to a nose gear when all the spoilers are deployed at the same time.

In the drive system for a ground spoiler according to the present invention, the control unit may preferably perform control for closing the deployed ground spoiler when the wheel speed is smaller than a predetermined second wheel reference speed or when the air speed is smaller than a predetermined second air reference speed after the ground spoiler is automatically deployed.

Even when the wheel is locked, the ground spoiler can be reliably closed automatically by considering the air speed.

In the present invention, the control for automatically closing the ground spoiler can be performed independently of the control for automatically deploying the ground spoiler.

In the drive system for a ground spoiler according to the present invention, the control unit may perform control for deploying the ground spoiler when the wheel speed continuously exceeds the first wheel reference speed for a predetermined length of time, or when the air speed continuously exceeds the first air reference speed for a predetermined length of time.

The control unit may also perform control for closing the deployed ground spoiler when the wheel speed is continuously smaller than the second wheel reference speed for a predetermined length of time, or when the air speed is continuously smaller than the second air reference speed for a predetermined length of time.

This is to more reliably determine that the condition is satisfied.

In the drive system for a ground spoiler according to the present invention, the first wheel reference speed and the first air reference speed may be set to different values, or the second wheel reference speed and the second air reference speed may be set to different values.

In accordance with the present invention, since it is determined whether to deploy the ground spoiler in consideration of the air speed in addition to the wheel speed, the ground spoiler can be reliably deployed automatically even when the wheel is locked.

BRIEF DESCRIPTION OF THE DRAWINGS

FIG. 6 is a view illustrating a process in which the spoiler is automatically deployed and automatically closed at the time of RTO (Reject Takeoff) along with forming conditions and timings thereof.

DETAILED DESCRIPTION OF THE PREFERRED EMBODIMENT

In the following, the present invention is described in detail based on an embodiment shown in the accompanying drawings.

Figure 1:
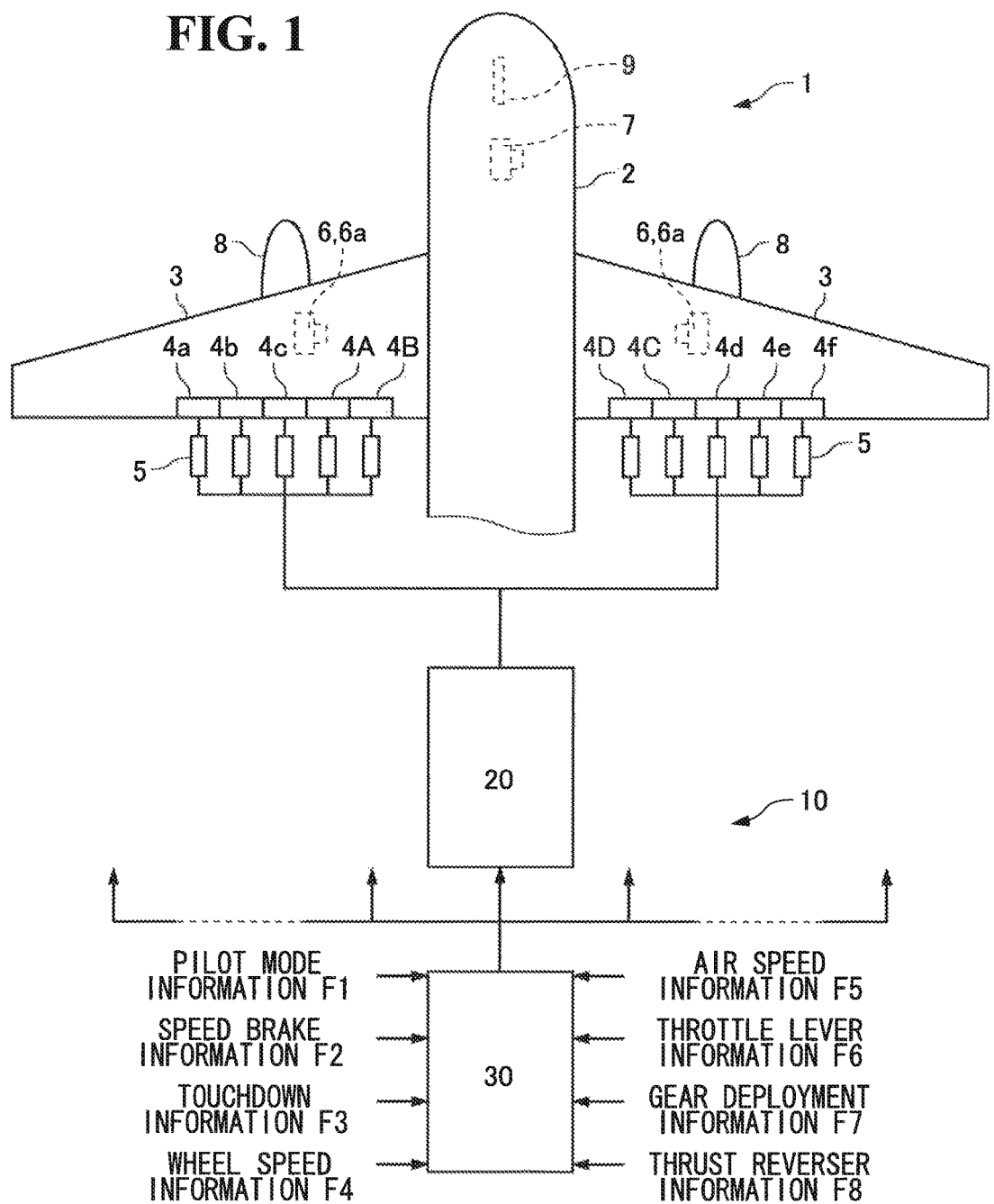
FIG. 1 is a schematic view illustrating a configuration of a drive device for a ground spoiler according to a present embodiment.

As shown in FIG. 1, a ground spoiler drive system 10 according to the present embodiment automatically deploys (sometimes referred to as "automatic deployment" below) ground spoilers 4A to 4D that are provided at trailing edges of main wings 3 of an aircraft 1 without being operated by a pilot, and also automatically closes (sometimes referred to as "automatic closing" below) the ground spoilers 4A to 4D after deploying the ground spoilers without being operated by a pilot.

The aircraft 1 includes main gears 6 provided on lower surfaces of the main wings 3, and a nose gear 7 provided on a lower surface of a fuselage 2 ahead of the main gears 6 in a flight direction.

Each of the ground spoilers (sometimes abbreviated to "GS" below) 4A, 4B, 4C, and 4D is coupled to an actuator 5 that is driven by a hydraulic source. When the respective actuators 5 are driven, the ground spoilers 4A to 4D are deployed or closed. At the trailing edges of the main wings 3, multi-function spoilers (sometimes abbreviated to "MFS" below) 4a, 4b, 4c, 4d, 4e, and 4f are also provided so as to be located closer to wing tip sides than the ground spoilers 4A to 4D. The MFSs 4a to 4f function as flight spoilers that reduce altitude during a flight, and also function as ground spoilers after landing. In the present embodiment, the MFSs 4a to 4f are also to be automatically deployed or automatically closed as the ground spoilers.

In the following, when it is not necessary to distinguish the ground spoilers (GSs) 4A to 4D and the multi-function spoilers (MFSs) 4a to 4f from each other, the spoilers are simply referred to as the spoilers 4. Among the GSs 4A, 4B, 4C, and 4D, the GS 4A and the GS 4D located at symmetrical positions relative to the fuselage 2 are paired, and the GS 4B and the GS 4C are similarly paired. The same applies to the MFSs 4a to 4f.

The aircraft 1 includes a control unit 20 that controls the spoilers, and an aircraft control system 30 that is superordinate to the control unit 20 and enables the aircraft 1 to be on automatic pilot. The control unit 20, some functions of the aircraft control system 30, and various sensors described below constitute the ground spoiler drive system 10.

The aircraft control system 30 acquires and retains various state information F1 to F8 of the aircraft 1. To acquire the state information F1 to F8, the aircraft control system 30 is connected to various sensors (not shown) provided in the aircraft 1.

The control unit 20 acquires the state information F1 to F8 of the aircraft 1 from the aircraft control system 30. The control unit 20 determines whether to open and close the GSs 4A to 4D based on the acquired state information F1 to F8, and outputs an operation command to the actuators 5 based on the determination result.

In the following, an example in which the control unit 20 acquires the state information of the aircraft 1 via the aircraft control system 30 is described. The control unit 20 may also acquire the state information directly from the various sensors provided in the aircraft 1.

In the following, the state information F1 to F8 in the present embodiment is described.

[Pilot Mode Information F1]

The control unit 20 acquires pilot mode information F1.

In the aircraft 1, one of an automatic pilot mode in which a pilot has the aircraft control system 30 control the aircraft 1, and a direct mode in which a pilot can intervene in the control is selected. The control unit 20 acquires the pilot mode information F1 that specifies which pilot mode is selected from the automatic pilot mode and the direct mode from the aircraft control system 30.

[Speed Brake Information F2]

The control unit 20 acquires speed brake information F2 that specifies whether or not a speed brake is working. The speed brake information F2 is also acquired from the aircraft control system 30. The speed brake is provided on a center pedestal, and determined to be usable or not by a pilot operation.

[Touchdown Information F3]

The control unit 20 acquires touchdown information F3 that specifies whether or not the main gears 6 touch down.

The main gears 6 are respectively provided on the lower surfaces of the right and left main wings 3 as shown in FIG. 1. Each of the main gears 6 includes a sensor (not shown) that detects whether a wheel 6a thereof is in contact with a runaway, that is, touches down.

Any mechanism may be employed so as to detect the touchdown of the main gears 6. For example, the touchdown on a runaway can be detected by configuring the main gears 6 (the wheels 6a) to retract when a load is applied thereto and to extend when no load is applied thereto, and detecting the retraction and extension state of the main gears 6 by the sensors.

The control unit 20 acquires the above detection result as the touchdown information F3 of the right and left main gears via the aircraft control system 30. [Wheel speed information F4]

The control unit 20 acquires wheel speed information F4.

The wheel speed information F4 is a running speed of the wheels 6a obtained by calculation from a rotating speed of the wheels 6a. Any mechanism (wheel speed detecting part) may be employed so as to detect the rotating speed of the wheels 6a. A known mechanism such as a mechanical or optical mechanism may be used. The wheel speed information F4 is transmitted to the aircraft control system 30.

The control unit 20 acquires the wheel speed information F4 via the aircraft control system 30 during the touchdown of the main gears 6.

If the wheels 6a do not rotate properly, a smaller (slower) speed than a real speed is output as the wheel speed information F4 even after the main gears 6 touch down. In an extreme case, 0 (zero) is output as the wheel speed information F4 if the wheels 6a are locked to the main gears 6 and cannot rotate.

The control unit 20 according to the present embodiment acquires next air speed information F5 so as to automatically deploy or close the GSs 4 even when the wheels 6a do not rotate properly.

[Air Speed Information F5]

The control unit 20 acquires air speed information F5.

The air speed information F5 is a relative speed (an airframe speed) of the aircraft 1 to the surrounding atmosphere. In the present embodiment, the air speed information F5 is measured by using a pitot tube 9 (air speed detecting part). The measured air speed information F5 is transmitted to the aircraft control system 30.

The control unit 20 acquires the air speed information F5 via the aircraft control system 30 while the aircraft 1 is flying and running on a runaway surface.

[Throttle Lever Information F6]

The control unit 20 acquires throttle lever information F6.

A throttle lever is provided in a cockpit so as to allow a pilot to adjust the power of an engine 8 of the aircraft 1. The pilot moves the throttle lever forward and backward with a rotation axis thereof as the center to thereby adjust the power of the engine 8. The throttle lever information F6 is information that specifies a current position of the throttle lever. The throttle lever information F6 is transmitted to the aircraft control system 30.

The control unit 20 acquires the throttle lever information F6 via the aircraft control system 30. The control unit 20 determines whether the throttle lever is at an idling position (a position of the throttle lever at which the engine 8 is put into an idling state: also noted as "idle").

The aircraft 1 includes a right and left pair of throttle levers corresponding to the engines 8 respectively provided in the right and left main wings 3. The throttle lever information F6 is specified with respect to both the right and left throttle levers.

[Gear Deployment Information F7]

The control unit 20 acquires gear deployment information F7.

The gear deployment information F7 is information that specifies that each of the stored main gears 6 and the stored nose gear 7 is pulled out of the main wings 3 and the fuselage 2 and deployed, and that each of the deployed main gears 6 and the deployed nose gear 7 is fixed so as to maintain a deployed state. The gear deployment information F7 is transmitted to the aircraft control system 30. The control unit 20 acquires the gear deployment information F7 via the aircraft control system 30.

Since the main gears 6 are respectively provided on the right and left main wings 3, the gear deployment information F7 includes information regarding both the right and left main gears 6 and the nose gear 7.

[Thrust Reverser Information F8]

The control unit 20 acquires thrust reverser information F8.

The aircraft 1 includes a thrust reverser (not shown) in the engine 8. The thrust reverser is operated when a pilot moves the throttle lever to a reverse thrust position (also noted as "reverse"). The thrust reverser information F8 that specifies that the thrust reverser is in operation is transmitted to the aircraft control system 30. The control unit 20 acquires the thrust reverser information F8 via the aircraft control system 30.

Next, control for automatically opening and closing the spoilers 4 is described.

[Determination Whether to Perform the Automatic Deployment/the Automatic Closing]

Figure 2:
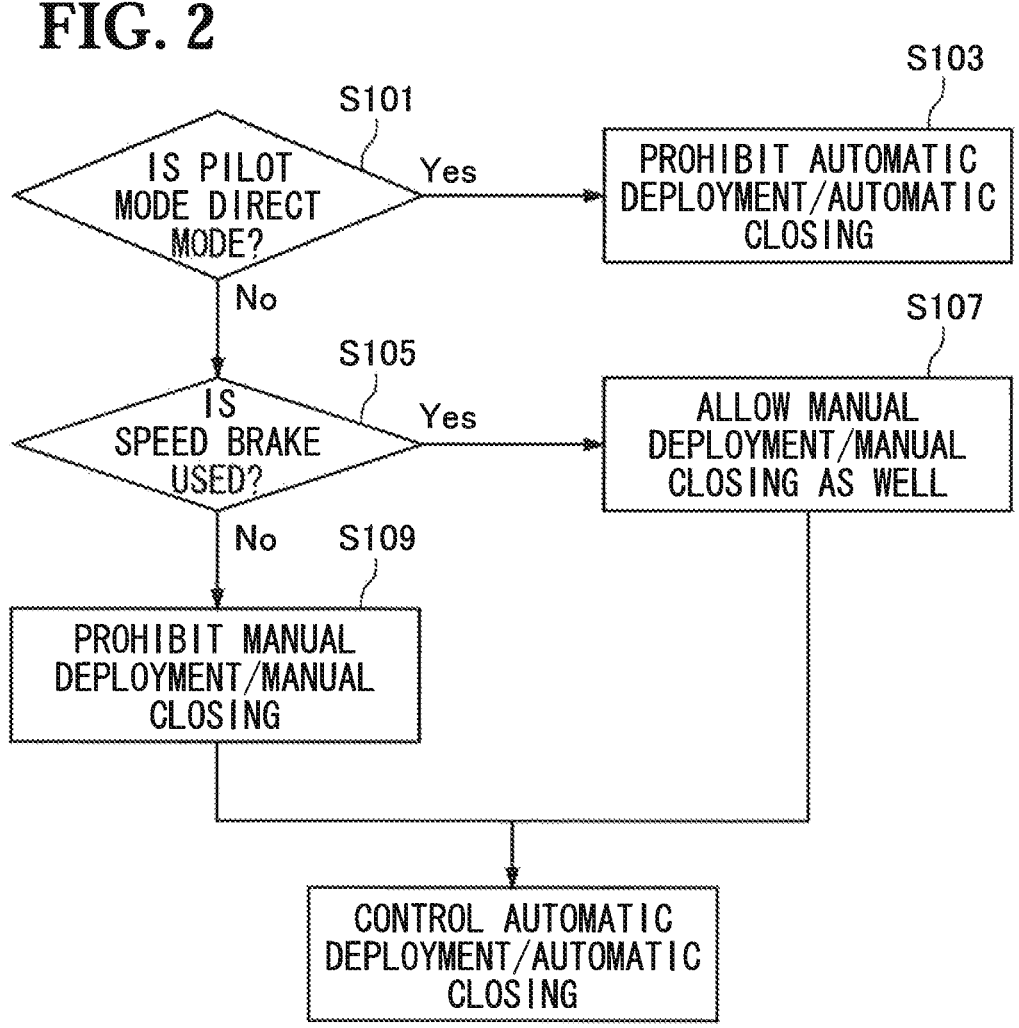
FIG. 2 is a view illustrating a procedure as a premise of automatic deployment and automatic closing in the present embodiment.

The control unit 20 acquires the state information of the aircraft 1 described above, and first determines whether to perform the automatic deployment/the automatic closing of the ground spoilers 4A to 4D and the multi-function spoilers 4a to 4f in a procedure shown in FIG. 2.

As shown in FIG. 2, the control unit 20 determines whether or not the acquired pilot mode information F1 indicates the direct mode (FIG. 2, S101). When the pilot mode information F1 indicates the direct mode, the control unit 20 prohibits the automatic deployment and the automatic closing of the GSs 4 and the MFSs 4 (FIG. 2, S103). In this case, a pilot manually opens and closes the GSs 4 and the MFSs 4.

In a case in which the control unit 20 acquires the speed brake information F2 that specifies that the speed brake is working, the control unit 20 allows the pilot to manually open and close the GSs 4 and the MFSs 4 (FIG. 2, S107). Meanwhile, when the speed brake is not working, the control unit 20 prohibits the pilot from manually opening and closing the GSs 4 and the MFSs 4 (FIG. 2, S109). In these cases, the GSs 4A to 4D and the MFSs 4a to 4f may be also automatically deployed or closed.

As described above, as long as the pilot mode information F1 indicates the automatic pilot mode, the spoilers 4 are automatically deployed and automatically closed in a following procedure.

The order of the determination whether the pilot mode information indicates the direct mode, and the determination whether the speed brake is used shown in FIG. 2 is employed for the convenience of description. The determinations may be performed at the same time or in reverse order. The same applies to FIGS. 3 and 4 described below.

First, the control of the automatic deployment of the spoilers 4 is described.

[Automatic Deployment of the GSs 4 and the MFSs 4]

Figure 3:
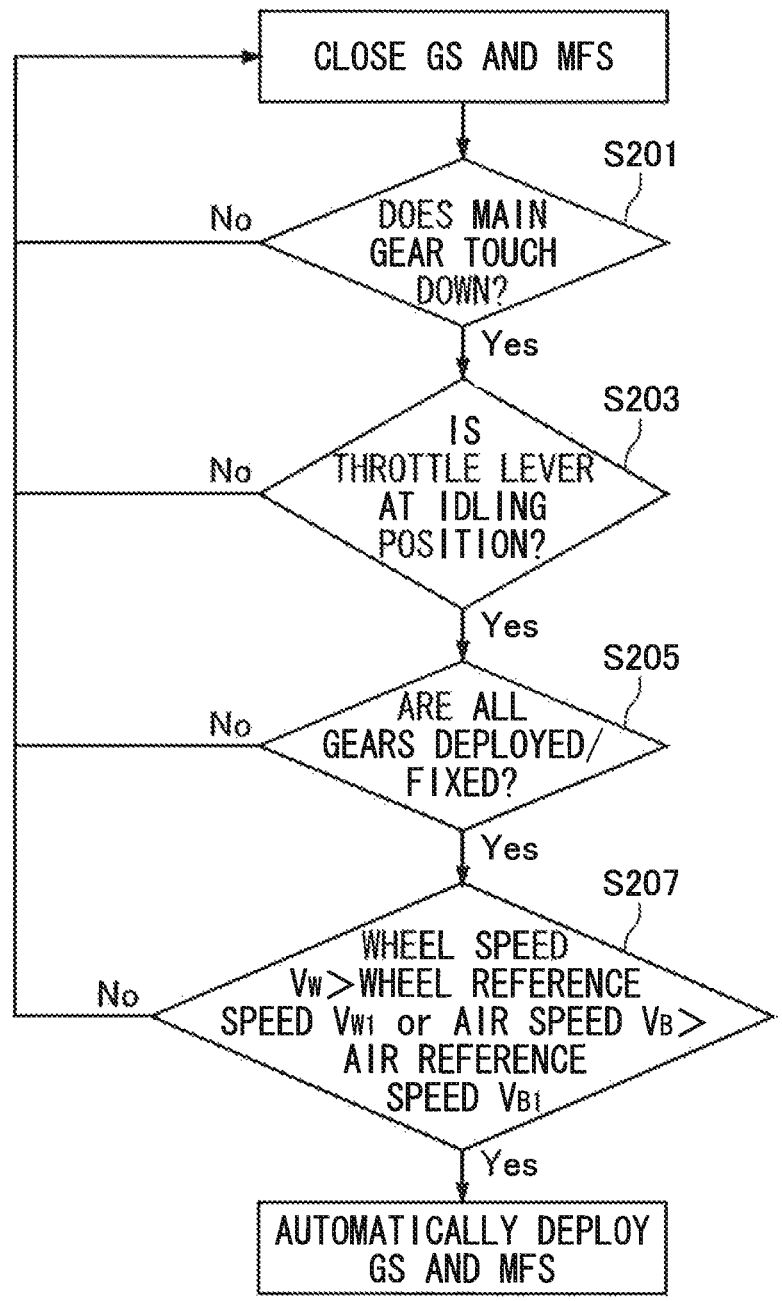
FIG. 3 is a view illustrating a procedure of the automatic deployment in the present embodiment.

The control unit 20 acquires the touchdown information F3, the throttle lever information F6, and the gear deployment information F7. As shown in FIG. 3, the control unit 20 determines that:

1) the touchdown information F3 is information that specifies that the main gears 6 touch down (FIG. 3, S201);

2) the throttle lever information F6 is information that specifies that the throttle levers are at the idling positions (FIG. 3, S203); and 3) the gear deployment information F7 is information that specifies that all of the main gears 6 and the nose gear 7 are deployed and fixed (FIG. 3, S205).

Subsequently, when all of the state information F3, F6, and F7 are the specifying information satisfying the above conditions 1) to 3), the control unit 20 further acquires the wheel speed information F4 and the air speed information F5. When a wheel speed $V_W$ specified by the wheel speed information F4 exceeds a wheel reference speed $V_{W1}$ set in advance, or when an air speed $V_B$ specified by the air speed information F5 exceeds an air reference speed $V_{B1}$ set in advance, the control unit 20 instructs the actuators 5 to respectively deploy the GSs 4 and the MFSs 4.

In the present embodiment, the touchdown information F3, the throttle lever information F6, and the gear deployment information F7 are set as the conditions for the automatic deployment for following reasons.

First, the GSs 4 and the MFSs 4 are deployed after the aircraft 1 lands on the ground. Thus, the control unit 20 acquires the touchdown information F3, and sets the touchdown of the wheels 6a of the main gears 6 as the conditions for the automatic deployment.

As described above, the main gears 6 are respectively provided on the right and left main wings 3. The touchdown of the main gears 6 (the wheels 6a) means that the wheels 6a of both the main gears 6 touch down. This is because the aircraft 1 may be out of balance if the GSs 4 and the MFSs 4 are deployed with only one main gear 6 touching down.

The conditions for the automatic deployment may also include that the touchdown information F3 is continuously acquired for a predetermined length of time. This is to confirm that the aircraft 1 reliably lands on the ground. However, it is necessary to appropriately set the time length such that the automatic deployment of the GSs 4 and the MFSs 4 is not delayed.

Subsequently, with regard to the throttle lever information F6, it is set as the conditions for the automatic deployment that the throttle levers are at the idling positions (the engines are in an idling state) so as to confirm that the engines 8 are operated in a landing state.

The right and left pair of throttle levers are provided. Thus, that the throttle levers are at the idling positions in the throttle lever information F6 means that both the right and left throttle levers are at the idling positions. This is because the aircraft 1 may be out of balance if the GSs 4 are deployed in a state in which the powers of the right and left engines 8 are different.

The throttle lever information F6 is the same as the touchdown information F3 in that the conditions for the automatic deployment may also include that the throttle lever information F6 is continuously acquired for a predetermined length of time, and in the condition for setting the predetermined length of time.

Subsequently, with regard to the gear deployment information F7, it is set as the conditions for the automatic deployment that all of the main gears 6 and the nose gear 7 are deployed and fixed so as to confirm that all of the main gears 6 and the nose gear 7 are in a landing state. Thus, if one of the right and left main gears 6 is not deployed and fixed, the GSs 4 and the MFSs 4 are not automatically deployed. This is because the aircraft 1 may be out of balance if the GSs 4 and the MFSs 4 are deployed with any one of the nose gear 7, the right and left main gears 6 not fixed.

The gear deployment information F7 is the same as the touchdown information F3 in that the conditions for the automatic deployment may also include that the gear deployment information F7 is continuously acquired for a predetermined length of time, and in the condition for setting the predetermined length of time.

In the present embodiment, it is also set as the conditions for the automatic deployment that the acquired wheel speed $V_W$ (the wheel speed information F4) exceeds the wheel reference speed $V_{W1}$, or the acquired air speed $V_B$ (the air speed information F5) exceeds the air reference speed $V_{B1}$. As for the wheel speed $V_W$, both the right and left wheels 6a need to exceed the wheel reference speed $V_{W1}$.

The condition is to determine whether the speed of the aircraft 1 is high enough that it is necessary to rapidly decelerate the aircraft 1 on a runaway by deploying the spoilers 4 (the GSs 4 and the MFSs 4). Since the two speeds of the wheel speed $V_W$ of the main gears 6 and the air speed $V_B$ are used for the determination, the GSs 4 and the MFSs 4 can be automatically deployed even when the wheels 6a are locked for some reason. That is, when only the wheel speed $V_W$ is used for the determination, the wheel speed $V_W$ becomes low (including zero) when the wheels 6a are locked. Thus, even though the airframe speed of the aircraft 1 on the runaway is high, the aircraft 1 cannot be decelerated by automatically deploying the spoilers 4. Meanwhile, only the air speed $V_B$ may be used for the determination for automatically deploying the spoilers 4. However, since the wheel speed $V_W$ of the wheels 6a rotating in contact with a runaway surface is an absolute speed, the accuracy of the wheel speed $V_W$ is superior to that of the air speed $V_B$. It is also desirable to ensure redundancy for the speed detection.

Thus, the two speeds of the wheel speed $V_W$ and the air speed $V_B$ are used for the determination of the automatic deployment.

The wheel reference speed $V_{W1}$ and the air reference speed $V_{B1}$ may be set to the same speed value, or different speed values. That is, the air speed $V_B$ measured by the pitot tube 9 is assumed to have lower accuracy than the wheel speed $V_W$ due to wind. Thus, the air reference speed $V_{B1}$ is preferably set to a higher value than the wheel reference speed $V_{W1}$ such that the conditions for the automatic deployment are not satisfied by mistake when the aircraft 1 is parked on the ground.

The condition is the same as the touchdown information F3 in that the conditions for the automatic deployment may also include that the wheel speed $V_W$ continuously exceeds the wheel reference speed $V_{W1}$ for a predetermined length of time, or the air speed $V_B$ continuously exceeds the air reference speed $V_{B1}$ for a predetermined length of time, and in the condition for setting the predetermined length of time. It is favorable to set the above condition as the conditions for the automatic deployment so as to confirm that the aircraft 1 reliably lands on the ground. Especially with regard to the air speed $V_B$, the influence of wind during parking on the ground is considered. Also in this case, the time length of the air speed $V_B$ is preferably set to be longer than the time length of the wheel speed $V_W$ such that the conditions for the automatic deployment are not satisfied by mistake.

Next, the control of the automatic closing of the spoilers 4 is described.

[Automatic Closing of the GSs 4 and the MFSs 4]

Figure 4:
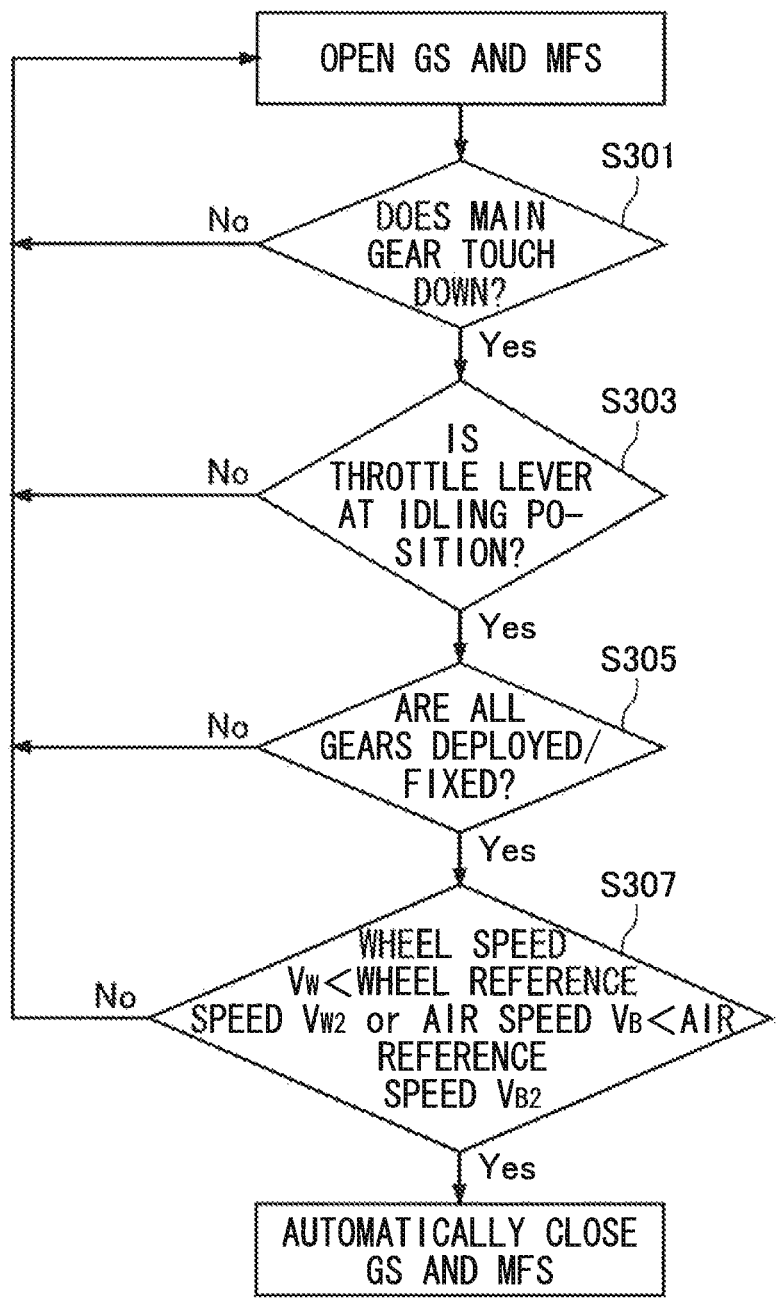
FIG. 4 is a view illustrating a procedure of the automatic closing in the present embodiment.

The control unit 20 acquires the touchdown information F3, the throttle lever information F6, and the gear deployment information F7. As shown in FIG. 4, the control unit 20 determines whether:

1) the touchdown information F3 is information that specifies that the main gears 6 touch down (FIG. 4, S301);

2) the throttle lever information F6 is information that specifies that the throttle levers are at the idling positions (FIG. 4, S303); and 3) the gear deployment information F7 is information that specifies that all of the main gears 6 and the nose gear 7 are deployed and locked (FIG. 4, S305).

Subsequently, when all of the state information F3, F6, and F7 are the above specifying information, the control unit 20 further acquires the wheel speed information F4 and the air speed information F5. When the wheel speed $V_W$ specified by the wheel speed information F4 is smaller than a wheel reference speed $V_{W2}$ set in advance, or when the air speed $V_B$ specified by the air speed information F5 is smaller than an air reference speed $V_{B2}$ set in advance, the control unit 20 instructs the actuators 5 to respectively close the GSs 4 and the MFSs 4.

The two speeds of the wheel speed $V_W$ of the main gears 6 and the air speed $V_B$ are used for the determination in the automatic closing for the same reason as that of the automatic deployment. That is, the spoilers 4 can be reliably closed automatically even when the wheels 6a are locked for some reason.

The wheel reference speed $V_{W2}$ and the air reference speed $V_{B2}$ may be set to the same speed value or difference speed values, and the conditions for the automatic closing may also include that the wheel speed $V_W$ and the air speed $V_B$ are continuously smaller than the wheel reference speed $V_{W2}$ and the air reference speed $V_{B2}$ for a predetermined length of time in a similar manner to the case of the automatic deployment.

Figure 5:
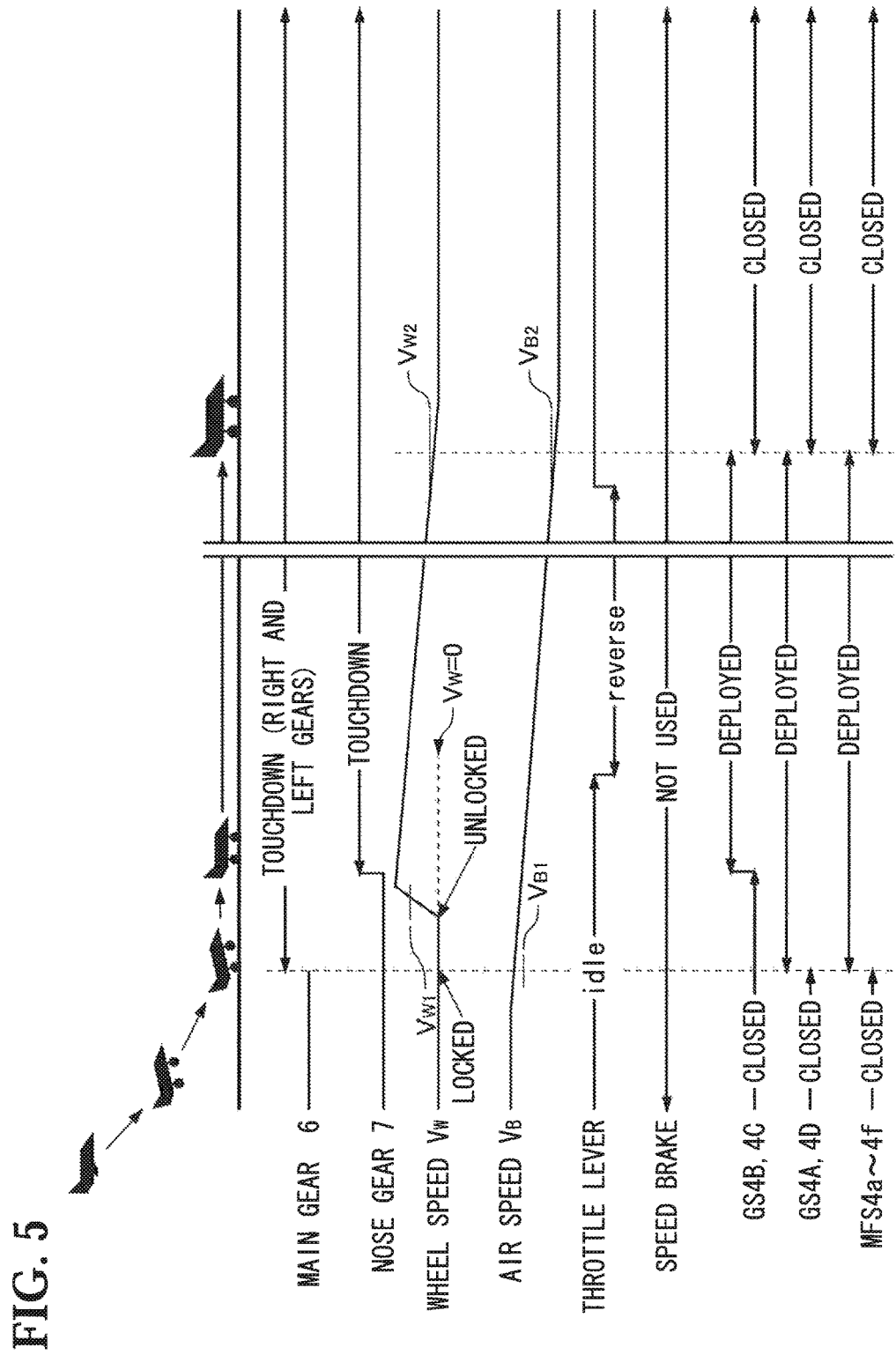
FIG. 5 is a view illustrating a process in which the ground spoiler is automatically deployed and automatically closed at the time of landing along with forming conditions and timings thereof.

Next, a process in which the GSs are automatically deployed and automatically closed along with forming conditions and timings thereof is described by reference to FIG. 5. FIG. 5 shows an example in which the wheels 6a of the main gears 6 are locked and do not rotate when touching down on a runaway with a frozen surface.

While the aircraft 1 is descending for landing, the main gears 6 do not touch down on the runaway. Thus, the wheel speed $V_W$ is zero. It is assumed that the automatic pilot mode is selected as the pilot mode.

When the aircraft 1 further descends to cause the main gears 6 to touch down on the runaway, the touchdown information F3 is transmitted to the control unit 20. Since the main gears 6 (the wheels 6a) are locked, the wheel speed information F4 keeps indicating zero. However, the acquired air speed information F5 (the air speed $V_B$) is higher than the air reference speed $V_{B2}$, so that the GSs 4A and 4D, and all the MFSs 4a to 4f, which has been closed, are immediately deployed automatically. Moreover, the remaining GSs 4B and 4C are automatically deployed after a lapse of a predetermined length of time from the automatic deployment. The wheels 6a are unlocked in the meantime.

The throttle levers continue to be positioned at the idling positions (idle) as well as during descending. The control unit 20 acquires the above situation as the throttle lever information F6. The speed brake is not used during the process.

After the nose gear 7 also touches down, the throttle levers are moved to the reverse thrust positions (reverse). The thrust reversers are thereby operated. The control unit 20 then acquires the thrust reverser information F8 via the aircraft control system 30. The reverse thrust also helps the wheel speed $V_W$ and the air speed $V_B$ to be gradually reduced. When the wheel speed is continuously smaller than the wheel reference speed $V_{W2}$ for a predetermined length of time, or when the air speed is continuously smaller than the air reference speed $V_{B2}$ for a predetermined length of time, the GSs 4A to 4D and the MFSs 4a to 4f are automatically closed. The thrust reverser information F8 is used for checking the positions of the throttle levers for the automatic deployment at the time of RTO (Reject Takeoff) described below.

In the example in FIG. 5, the deployment of the GSs 4B and 4C is delayed from the deployment of the other GSs 4A and 4D and the MFSs 4. When all the spoilers are deployed at the same time, a pitching moment in a direction to lower a nose of the aircraft 1 becomes excessive. Before the nose gear 7 touches down, a large load is applied to the nose gear 7 along with an impact. The deployment of the GSs 4B and 4C is delayed so as to avoid the above problem. As a timing for deploying the GSs 4B and 4C, the deployment may be performed after a lapse of a predetermined length of time, or may be also performed on condition that the nose gear 7 touches down. This is because the load from the impact can be avoided when the nose gear 7 has already touched down.

Next, the automatic deployment and the automatic closing of the GSs 4 and the MFSs 4 may be also applied to the RTO (Reject Takeoff). One example thereof is described by reference to FIG. 6.

As shown in FIG. 6, when the aircraft 1 starts to take off, the throttle levers are moved from the positions of "idle" to positions of "Take-Off". When the takeoff is rejected for some reason, the throttle levers are moved to the positions of "reverse". That is, the GS 4A and the like are automatically deployed when three conditions that the main gears 6 and the nose gear 7 are deployed and touch down, the throttle levers are at the positions of "reverse", and the wheel speed $V_W$ and the air speed $V_B$ are larger than a predetermined value are satisfied as shown in FIG. 6. Meanwhile, the GS 4A and the like are automatically closed when three conditions that the main gears 6 and the nose gear 7 are deployed and touch down, the throttle levers are at the positions of "idle", and the wheel speed $V_W$ and the air speed $V_B$ are smaller than a predetermined value are satisfied.

Although the present invention has been described based on the embodiment, the constitutions described in the embodiment described above may be also freely selected or changed into other constitutions without departing from the scope of the present invention.

The aircraft 1 is merely one example. Particularly, the positions and the number of the ground spoilers (the GSs 4A to 4D and the MFSs 4a to 4f) shown in FIG. 1 are not a limiting element of the present invention. Although the automatic deployment of the GSs 4B and 4C is delayed in the present embodiment, this is also not a limiting element of the present invention. All the spoilers may be deployed at the same time depending on the positions and the number of the ground spoilers. Any ground spoiler may be appropriately selected as the ground spoiler to be delayed in deployment.

What is claimed is:

1. A drive system for a ground spoiler of an aircraft comprising:
   wheel speed detecting part configured to detect a wheel speed of the aircraft;
   air speed detecting part configured to detect an air speed of the aircraft; and
   a control unit configured to control driving of the ground spoiler,
   wherein with a main gear of the aircraft touching down, the control unit is configured to perform control for deploying the ground spoiler when the wheel speed exceeds a predetermined first wheel reference speed or when the air speed exceeds a predetermined first air reference speed.

2. The drive system for a ground spoiler according to claim 1, wherein the ground spoiler includes a plurality of ground spoilers, and
   the control unit is configured to deploy the ground spoiler by deploying one or some of the plurality of ground spoilers while delaying deployment of the remaining of the plurality of ground spoilers by a predetermined length of time.

3. The drive system for a ground spoiler according to claim 1, wherein the control unit is configured to perform control for deploying the ground spoiler when the wheel speed continuously exceeds the first wheel reference speed for a predetermined length of time.

4. The drive system for a ground spoiler according to claim 1, wherein the control unit is configured to perform control for deploying the ground spoiler when the air speed continuously exceeds the first air reference speed for a predetermined length of time.

5. The drive system for a ground spoiler according to claim 1, wherein the first wheel reference speed and the first air reference speed are set to different values.

6. An aircraft comprising the drive system for a ground spoiler according to claim 1.

7. The drive system for a ground spoiler according to claim 1, wherein after the ground spoiler is deployed, the control unit is configured to perform control for closing the deployed ground spoiler when the wheel speed is smaller than a predetermined second wheel reference speed or when the air speed is smaller than a predetermined second air reference speed.

8. The drive system for a ground spoiler according to claim 7, wherein the control unit is configured to perform control for closing the deployed ground spoiler when the wheel speed is continuously smaller than the second wheel reference speed for a predetermined length of time.

9. The drive system for a ground spoiler according to claim 7, wherein the control unit is configured to perform control for closing the deployed ground spoiler when the air speed is continuously smaller than the second air reference speed for a predetermined length of time.

10. The drive system for a ground spoiler according to claim 7, wherein the second wheel reference speed and the second air reference speed are set to different values.

11. A drive system for a ground spoiler of an aircraft comprising:
wheel speed detecting part that is configured to detect a wheel speed of the aircraft;
air speed detecting part that is configured to detect an air speed of the aircraft; and
a control unit that is configured to control driving of the ground spoiler,
wherein with a main gear of the aircraft touching down and the ground spoiler deployed, the control unit is configured to perform control for closing the deployed ground spoiler when the wheel speed is smaller than a predetermined second wheel reference speed or when the air speed is smaller than a predetermined second air reference speed.

12. An aircraft comprising the drive system for a ground spoiler according to claim 11.

13. A method for driving a ground spoiler of an aircraft using a drive system, the method comprising:
detecting a wheel speed of the aircraft by a wheel speed detecting part;
detecting an air speed of the aircraft by an air speed detecting part; and
with a main gear of the aircraft touching down, deploying the ground spoiler by a control unit when the wheel speed exceeds a predetermined first wheel reference speed or when the air speed exceeds a predetermined first air reference speed.

14. The method according to claim 13, wherein the ground spoiler includes a plurality of ground spoilers, the method further comprising the step of deploying one or some of the plurality of ground spoilers while delaying deployment of the remaining of the plurality of ground spoilers by a predetermined length of time.

15. The method according to claim 13, wherein the ground spoiler is deployed when the wheel speed continuously exceeds the first wheel reference speed for a predetermined length of time.

16. The method according to claim 13, wherein the ground spoiler is deployed when the air speed continuously exceeds the first air reference speed for a predetermined length of time.

17. The method according to claim 13, wherein the first wheel reference speed and the first air reference speed are set to different values.

18. The method according to claim 13, wherein after the ground spoiler is deployed, the method further comprises the step of closing the deployed ground spoiler when the wheel speed is smaller than a predetermined second wheel reference speed or when the air speed is smaller than a predetermined second air reference speed.

19. The method according to claim 18, wherein the deployed ground spoiler is closed when the wheel speed is continuously smaller than the second wheel reference speed for a predetermined length of time.

20. The method according to claim 18, wherein the deployed ground spoiler is closed when the air speed is continuously smaller than the second air reference speed for a predetermined length of time.

* * * * *

UNITED STATES PATENT AND TRADEMARK OFFICE
CERTIFICATE OF CORRECTION

PATENT NO. : 9,630,705 B2
APPLICATION NO. : 14/190756
DATED : April 25, 2017
INVENTOR(S) : Akihiro Hara It is certified that error appears in the above-identified patent and that said Letters Patent is hereby corrected as shown below:

In the Specification

Column 9, Line 17, "$V_{B2}$" should read -- $V_{B1}$ --.

Signed and Sealed this
First Day of August, 2017

Joseph Matal
*Performing the Functions and Duties of the*
*Under Secretary of Commerce for Intellectual Property and*
*Director of the United States Patent and Trademark Office*